United States Patent
Ishikawa et al.

(10) Patent No.: US 6,765,631 B2
(45) Date of Patent: Jul. 20, 2004

(54) VEHICLE WINDSHIELD RAIN SENSOR

(75) Inventors: Junichi Ishikawa, Kariya (JP); Masao Tokunaga, Gamagori (JP)

(73) Assignee: Denso Corporation, Kariya (JP)

( * ) Notice: Subject to any disclaimer, the term of this patent is extended or adjusted under 35 U.S.C. 154(b) by 184 days.

(21) Appl. No.: 10/214,141

(22) Filed: Aug. 8, 2002

(65) Prior Publication Data
US 2003/0029237 A1 Feb. 13, 2003

(30) Foreign Application Priority Data

Aug. 9, 2001 (JP) ........................................ 2001-242816
May 30, 2002 (JP) ........................................ 2002-156918

(51) Int. Cl.[7] ................................................ H02P 7/00
(52) U.S. Cl. .................... 349/58; 318/445; 318/456; 318/483; 318/DIG. 2
(58) Field of Search ................................ 318/445, 456, 318/483; 15/250.01; 349/58

(56) References Cited

U.S. PATENT DOCUMENTS

| | | | | |
|---|---|---|---|---|
| 4,620,141 A | * | 10/1986 | McCumber et al. | 318/483 |
| 5,436,541 A | * | 7/1995 | Mangler et al. | 318/483 |
| 5,847,826 A | * | 12/1998 | Fukui et al. | 356/335 |
| 6,218,741 B1 | * | 4/2001 | Braun et al. | 307/10.1 |
| 6,331,819 B1 | * | 12/2001 | Hog | 340/604 |

* cited by examiner

*Primary Examiner*—Daniel A. Hess
(74) *Attorney, Agent, or Firm*—Nixon & Vanderhye P.C.

(57) ABSTRACT

A rain sensor includes an amplifier circuit that amplifies an output voltage from a photodiode and then provides this voltage signal to a CPU. The amplifier circuit conducts an offset amplification. The output voltage from the amplifier circuit is controlled to be at a predetermined level, for example, 3.0V, and the CPU detects rainfall based on the drop in the output voltage from the predetermined level, 3.0V. Then it becomes possible to improve sensor sensitivity, maintain a small sensor size, and a low manufacturing cost.

5 Claims, 3 Drawing Sheets

WITHOUT OFFSET AMPLIFIER

WITH OFFSET AMPLIFIER

VEHICLE WINDSHIELD RAIN SENSOR

CROSS REFERENCE TO RELATED APPLICATION

This application is based upon, claims the benefit of priority of, and incorporates by reference the contents of prior Japanese Patent Applications No. 2001-242816 filed Aug. 9, 2001, and No. 2002-156918 filed May 30, 2002.

BACKGROUND OF THE INVENTION

1. Field of the Invention

The present invention relates to rain sensors, and in particular, to an optical rain sensor that is mounted on the inner surface of a vehicle windshield to detect raindrops adhered to the outer surface of the vehicle windshield.

2. Description of the Related Art

Generally, in optical rain sensors, a light beam emitted from a light source such as a light emitting diode (LED) is incident on the inner surface of the windshield glass via a prism. The light beam reflected from the outer surface of the windshield is collected by a prism and then is received by a photoelectric transducer such as a photodiode. Since the detection signal from the photoelectric transducer is very weak, the detected voltage is usually amplified in an amplifier circuit, and then the amplified output voltage is input to a calculation circuit. After the output voltage from the amplifier circuit has been raised to a predetermined voltage level, for example, 3.0V for analog/digital (A/D) conversion, the sensor detects raindrop precipitation based on the magnitude of decrease (or a decrease ratio) in output voltage from this predetermined voltage.

The sensor sensitivity to raindrops is significantly dependent on the area of the outer windshield surface (detection area) onto which the sensor light beam is irradiated. The larger the detection area, the easier the sensor detects raindrops. This is because the larger the detection area, the more likely raindrops will hit this detection area.

If the detection area is enlarged, however, the sensor body becomes large and may obstruct the driver's view because the sensor is installed near the rearview mirror installation location. At the same time, the sensor cost will increase and become high.

Conventionally, the threshold value for detecting precipitation has been raised with a software program, so that rainfall can be detected even by a weak sensor signal. However, such a software-based adjustment for higher sensitivity is subject to constraints of the resolution of the employed A/D converter. As a result of the limited sensitivity, it has been difficult to detect rainfall with a high level of sensitivity.

SUMMARY OF THE INVENTION

It is therefore an object of the present invention to solve the above-mentioned problems by providing a rain sensor that has improved sensitivity while being simple in structure, compact in size, and having a low manufacturing cost.

A rain sensor has an amplifier circuit that amplifies an output voltage from a photoelectric transducer and provides this output voltage signal to a calculation circuit. The rain sensor raises the output voltage from the amplifier circuit up to a predetermined level and detects rainfall based on the drop in the output voltage from the predetermined level. The present invention provides an improvement that the amplifier circuit conducts an offset amplification.

According to the rain sensor of this invention, the offset amplification augments the output voltage drop from the predetermined value, even when the intensity of rainfall is the same. As a result, it becomes possible to raise sensor sensitivity while maintaining sensor compactness and a low manufacturing cost.

If the offset level in such offset amplification is variable, it becomes possible to raise sensor sensitivity by increasing the offset level, for example, during periods when the driver runs the car at night or at high speeds. In turn, when the car is at a standstill, the sensor sensitivity may be lowered by decreasing the offset level. In this manner, the sensor sensitivity becomes controllable in the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Now the rain sensor according to a preferred embodiment of the invention will be described with reference to the accompanying drawings. The following description of the preferred embodiment is merely exemplary in nature and is in no way intended to limit the invention, its application, or uses.

Figure 1:
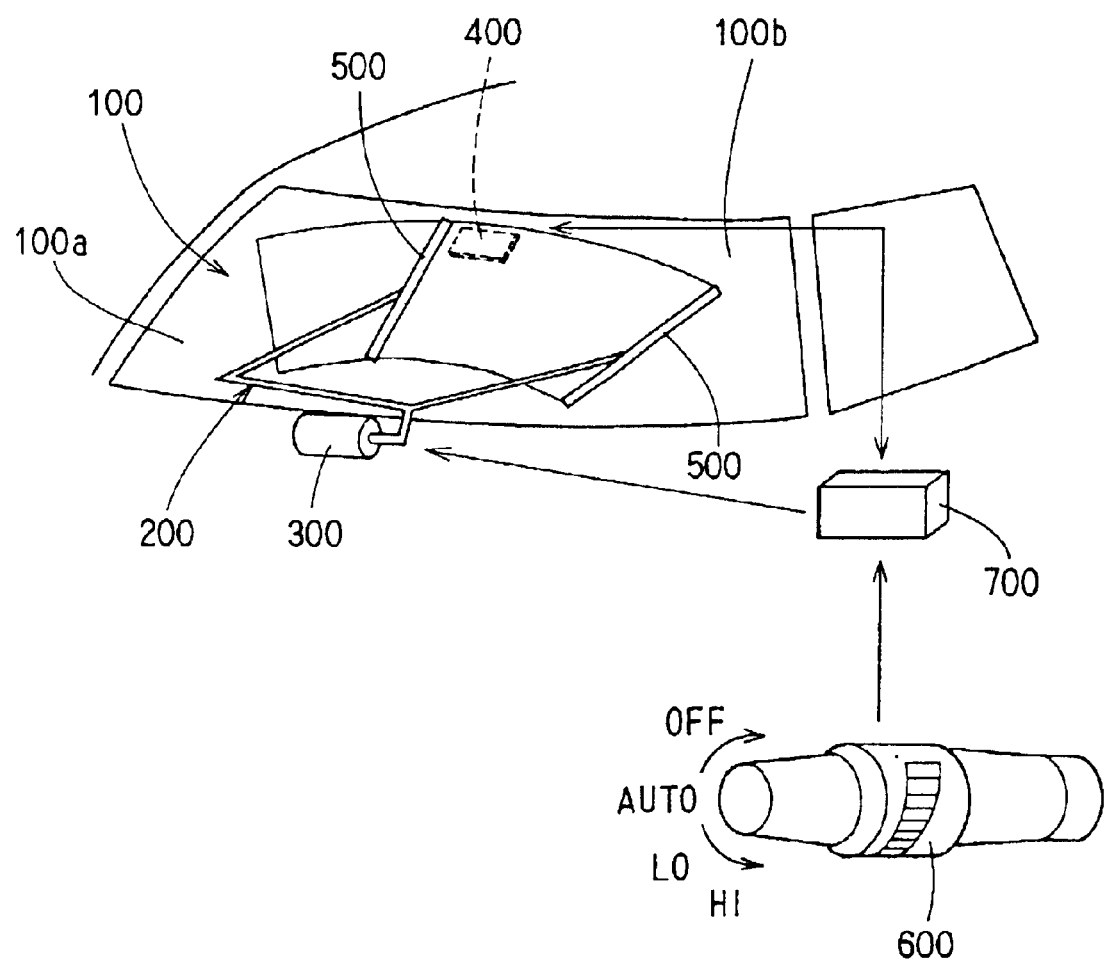
FIG. 1 is a schematic diagram illustrating the system configuration of a wiper control system using a rain sensor according to an embodiment of the present invention.
Figure 2:
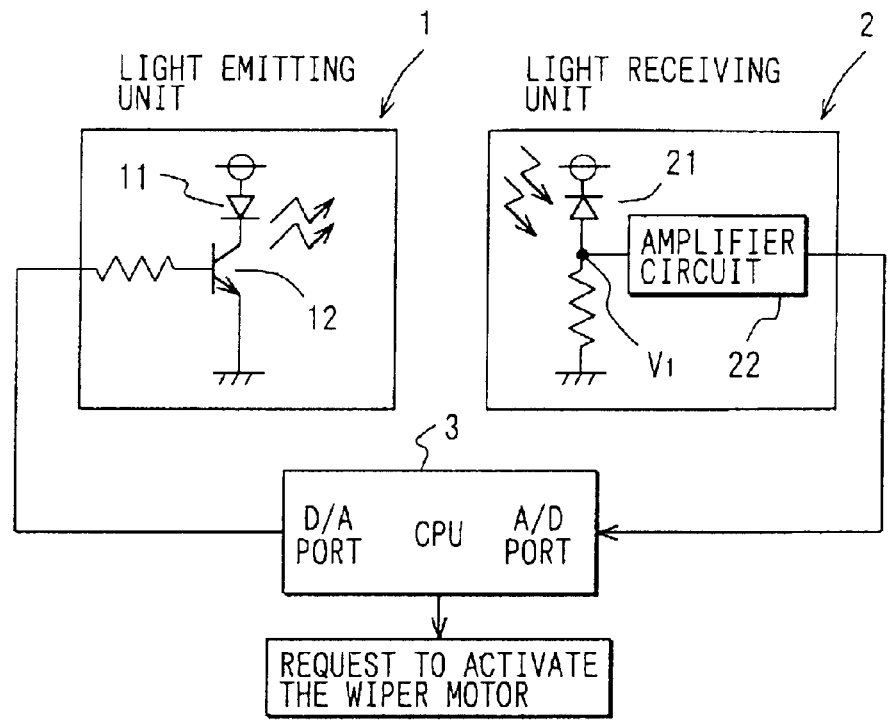
FIG. 2 is a circuit diagram of the rain sensor according to an embodiment of the present invention.
Figure 3:
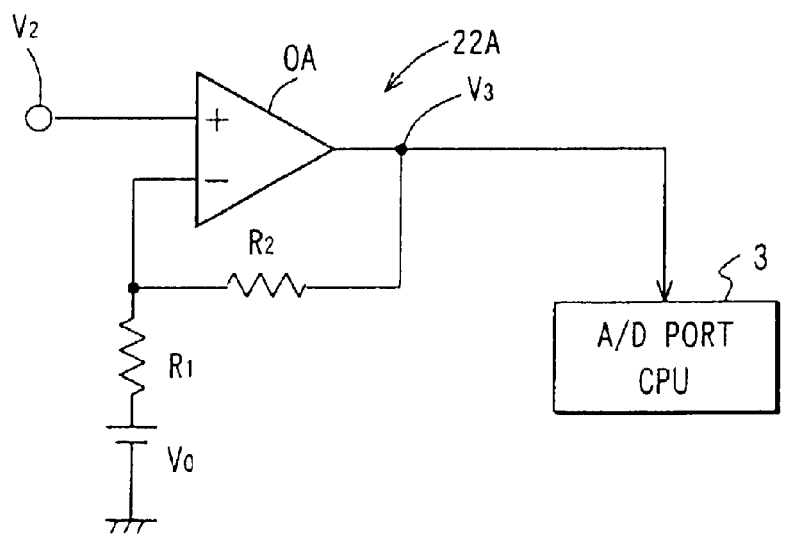
FIG. 3 is a circuit diagram of an offset amplifier circuit in an amplifier circuit.
Figure 4A:
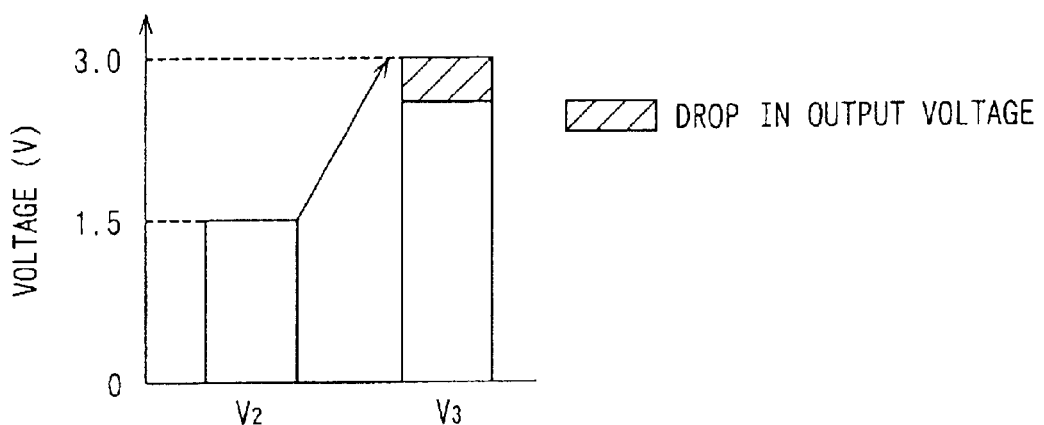
FIG. 4A is a diagram demonstrating the effect of the present embodiment.
Figure 4B:
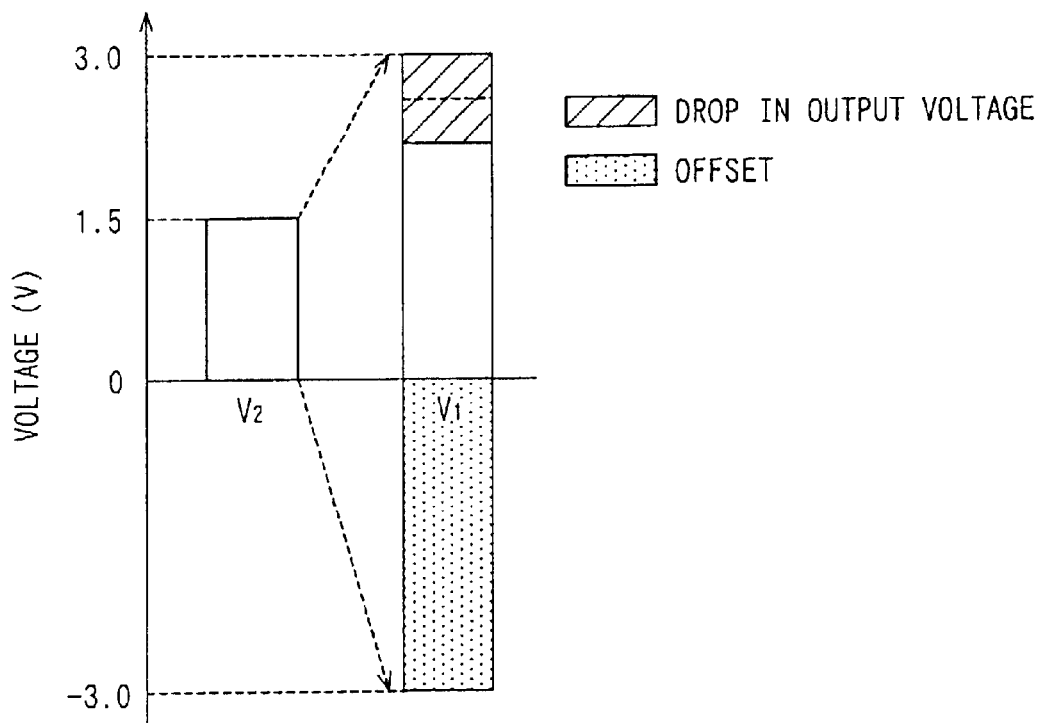
FIG. 4B is a diagram demonstrating the effect of the present embodiment.

FIG. 1 is a schematic diagram of a wiper control system using a rain sensor according to an embodiment of the invention. FIG. 2 is a circuit diagram of a rain sensor. FIG. 3 is a circuit diagram of an offset amplifier circuit in an amplifier circuit. FIGS. 4A and 4B are diagrams illustrating the effect of the present invention.

In FIG. 1, a wiper 200 is installed on the outer surface 100a of the windshield 100 and is driven by a wiper motor (wiper driver motor) 300 to wipe off raindrops that have adhered to the outer surface 100a of the windshield 100 during rainfall. A rainfall sensor 400 is mounted on the inner surface 100b of the windshield 100. The rainfall sensor 400 is installed in a position which is convenient to detect the adhesion of raindrops in a region, on the outer windshield surface 100a, from which raindrops are wiped out by a wiper blade 500. This position is one that does not impair driver visibility, and the sensor itself is small enough to ensure this visibility.

In the cabin of the vehicle, a wiper switch 600 is installed and activated by the passenger. The wiper switch 600 has a variable position, selectable switch which has, at least, an automatic mode, AUTO, by which the wiper 200 is automatically controlled by the output from the rain sensor 400 and a deactivate mode, OFF, which deactivates the wiper. In addition, the wiper switch 600 may have a switch which has a low-speed wipe mode, LO, by which the wiper 200 runs at a low speed and a high-speed wipe mode, HI, by which the wiper 200 runs at a high speed. The wiper motor 300, rain sensor 400 and wiper switch 600 are electrically connected to a wiper driver circuit 700.

Referring now to FIG. 2, the rain sensor 400 has a light emitting unit 1, light receiving unit 2 and central processor unit (CPU) 3. The light emitting unit 1 has an LED 11 as a light source, and the light intensity of LED 11 is controlled by a current-controlled transistor 12 that works as a light intensity controlling device. The light emitted from LED 11 enters the windshield 100 from its inner surface 100b via prisms and is then reflected by the outer surface 100a of the windshield 100. The reflected light is gathered by a prism and received by a photodiode (photoelectric transducer) 21 in the light receiving unit 2.

The light receiving unit 2 has one photodiode 21. This photodiode 21 receives the light reflected by the outer glass surface 100a and generates a current proportional to the intensity of the received light. The light receiving unit 2 has an amplifier circuit 22. This amplifier circuit 22 receives the current generated in the photodiode 21 in the form of detection voltage $V_1$ and amplifies this detection voltage $V_1$ before sending this voltage signal to the A/D port of CPU 3. The amplifier circuit 22 includes an amplifier circuit (not shown) in the pre-amplifier stage(s) (either one or more than one stage) and an offset amplifier circuit 22A, shown in FIG. 3, which is connected to the output terminal of the pre-amplifier circuit. In FIG. 3, the output voltage $V_2$ from the pre-amplifier circuit is entered to the noninverting input terminal of an operational amplifier, OA. A feedback resistor $R_2$ is inserted between the output terminal and the inverting input terminal, and a resistor $R_1$ and a power supply, Vo, for offsetting are inserted between the inverting input terminal and the ground, GND. Then the output voltage, $V_3$, from the operational amplifier OA is expressed by following Equation (1), and $(R_2/R_1)$Vo provides the offset value (offset voltage).

$$V_3 = (1+R_2/R_1)V_2 - (R_2/R_1)Vo \qquad \text{Equation (1)}$$

The output voltage $V_3$ is entered to the A/D port of CPU 3. The CPU 3 first conducts automatic gain control (AGC), namely, controls the gain of the pre-amplifier circuit for the amplifier circuit 22 and the base voltage of the current-controlled transistor 12 in the light emitting unit 1, so that the output voltage $V_3$ may be a predetermined voltage, for example, 3.0V. Then, the CPU 3 determines the intensity of rainfall based on the voltage drop from this output voltage $V_3$ (3.0V) during precipitation detection.

Note that in this embodiment, the output voltage $V_3$ from the amplifier circuit 22 is lower by an offset voltage, $(R_2/R_1)$Vo, than the conventional output voltage, namely, output voltage $V_3$ from an amplifier circuit 22 having no offset (Vo=0). Thus the voltage is elevated by the amplifier circuit up to 3.0V. If raindrops adhere to the glass under this situation, the decrease in intensity of sensor light received by the photodiode 21 has no difference between the embodiment and the prior art. However, the voltage drop of the output voltage $V_3$ from the predetermined value of 3.0V in the embodiment becomes larger than that in the prior art. As a result, the CPU 3 can estimate, with high accuracy, the intensity of rainfall based on this larger voltage drop.

FIGS. 4A and 4B demonstrate how the output voltage drops, provided that the input voltage $V_2$ to the offset operational amplifier is 1.5V and the output voltage $V_3$ from the offset amplifier is 3V. For example:

1) In FIG. 4A, the input voltage can be raised to 3.0V by a gain of 2, and the intensity of rainfall is determined from the drop in the output voltage from 3.0V.
2) On the other hand, when doubling the above drop in output voltage by the offset amplifier, the gain must be set at 4, as shown in FIG. 4B, because the offset voltage $(R_2/R_1)$Vo is set at 3.0V and the predetermined voltage is adjusted to 3.0V as well.

If the offset amplifier circuit in number "2" above is employed, the drop in output voltage becomes twice that of the prior art, and the sensor sensitivity is thereby improved. The CPU 3 sends a request to the wiper driver circuit 700 to activate the wiper based on the sensed rainfall intensity, and then the wiper 200 is activated. Note that the offset voltage $(R_2/R_1)$Vo varies by changing the voltage Vo of the power supply or changing the resistances of resistors $R_1$ and $R_2$. In this way, it is possible to set the sensor sensitivity at any desired level.

As described so far, the rain sensor 400, including an amplifier circuit 22 that amplifies the output voltage $V_1$ from the photoelectric transducer (photodiode 21) and provides this voltage signal to a calculation circuit (CPU 3), first raises the output voltage $V_3$ from the amplifier circuit 22 to a predetermined level (for example, 3.0V) and detects rainfall based on the drop in output voltage $V_3$ from this predetermined level, 3.0V. In the present invention, the amplifier circuit 22 performs an offset amplification. Then, under a simple circuit configuration, the drop in output voltage $V_3$ from the predetermined level 3.0V is magnified for even the same intensity of precipitation. It becomes thereby possible to improve sensor sensitivity, maintain a small sensor size, and provide it with a low cost.

Furthermore, as the offset level in offset amplification is variable, it is possible to raise sensor sensitivity by increasing the offset level, for example, when the driver runs the car at night or at high speed. In turn, when the car is at a standstill, the sensor sensitivity may be lowered by decreasing the offset level. In this manner, the sensor sensitivity becomes controllable in the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle rain sensor, comprising:
    a photoelectric transducer having an output voltage;
    an amplifier circuit for amplifying the output voltage of the photoelectric transducer and conducting an offset amplification;
    a calculation circuit for receiving the output voltage from the amplifier circuit, wherein
    the output voltage from the amplifier circuit is elevated to a predetermined level and detects rainfall based on a decrease in the output voltage from the predetermined level.

2. The rain sensor according to claim 1, wherein the offset level in said offset amplification is variable.

3. The rain sensor according to claim 1, wherein the offset level in said offset amplification is variable such that it is possible to raise sensor sensitivity by increasing the offset level and lower the sensor sensitivity by decreasing the offset level.

4. A method of operating a rain sensor comprising:
amplifying, by an amplifier circuit, an output voltage from a photoelectric transducer;
providing said output voltage to a calculation circuit;
raising said output voltage from said amplifier circuit to a predetermined level;
detecting rainfall based on a drop in said output voltage from said predetermined level; and
conducting an offset amplification by said amplifier circuit.

5. A method of operating a rain sensor according to claim 4, further comprising:
varying said offset level during said offset amplification.

* * * * *

UNITED STATES PATENT AND TRADEMARK OFFICE
CERTIFICATE OF CORRECTION

PATENT NO. : 6,765,631 B2
DATED : July 20, 2004
INVENTOR(S) : Ishikawa et al.

It is certified that error appears in the above-identified patent and that said Letters Patent is hereby corrected as shown below:

<u>Title page,</u>
Item [73] Assignee, should read -- Denso Corporation, Kariya (JP) and Nippon Soken, Inc., Nishio-city, (JP) --

Signed and Sealed this

Seventh Day of December, 2004

JON W. DUDAS
*Director of the United States Patent and Trademark Office*